May 9, 1933.　　T. P. K. RASHLEIGH　　1,908,553

MOTOR VEHICLE HEAD LAMP

Filed May 29, 1929

Inventor
Thomas Pollard Knight Rashleigh

By
Pennie Davis Marvin + Edmonds
attorneys

UNITED STATES PATENT OFFICE

THOMAS POLLARD KNIGHT RASHLEIGH, OF AUCKLAND, NEW ZEALAND, ASSIGNOR OF ONE-THIRD TO GEORGE JOHN UDY AND ONE-THIRD TO FREDERICK WILLIAM HERBERT, BOTH OF AUCKLAND, NEW ZEALAND

MOTOR VEHICLE HEAD LAMP

Application filed May 29, 1929, Serial No. 367,099, and in New Zealand June 18, 1928.

This invention has reference to improvements in the construction of motor vehicle head lamps, and which improvements have been devised with the object primarily of eliminating the glare from such lamps and at the same time providing for a full powered and wide light beam being thrown forwardly, downwardly and divergently from the lamp. A further object of the invention is to make provision in the head lamp whereby light therefrom may be directed rearwardly on to the vehicle, whenever required, and in order to illuminate its engine parts or its wheels so that these may be attended to in the dark.

The invention is illustrated in the accompanying drawing and will be hereinafter described in relation thereto.

In such drawing:—

Figure 1:
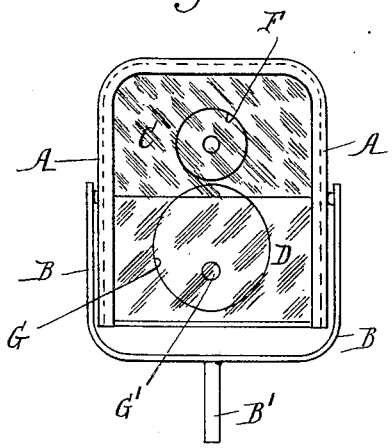
Figure 2:
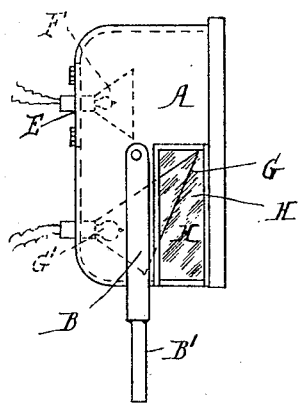
Figure 3:
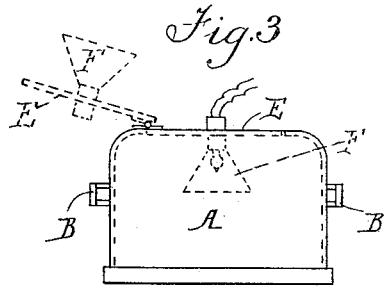
Figure 4:
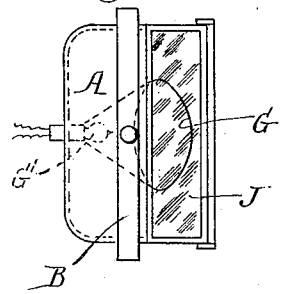

Figure 1 is a front elevation.
Figure 2 a side elevation,
Figure 3 a plan, and
Figure 4 an underneath plan, of a lamp made in accordance with the invention.

In this invention the lamp casing A is made of approximately rectangular shape and is supported between the forks B of an ordinary lamp bracket B' in the usual way. The front of the casing is glazed in two sections, an upper clouded or frosted glass section C and a lower clear glass section D. The lower part also is made with clear glass filled openings J in its bottom, and H in its two sides, the glass sheets of which extend rearward from the lamp's front edge for a distance and preferably make continuous joints with the corresponding edges of the lower front glass section.

Within the lower section of the casing a reflector G with its axis horizontal and having the form of a cone truncated by a vertically directed plane passing from a point near the front of the casing to a point near the center line of the casing, is fitted and so made and arranged as to throw the beams from the lamp bulb G' fitted inside the reflector with its axis horizontal, forwardly and downwardly through the clear glass front D of this section and also through the glass covered opening J in its bottom and in addition outwardly through the side glass covered openings H, in a clear divergent beam that is generally below the horizontal line of the lamp centre and thus free of dazzling interference with the vision of approaching drivers.

The upper section of the casing also contains a reflector and lamp bulb F attached to its back and arranged to throw its beam forwardly through the clouded or frosted glass front C of this section. This light may be used in addition to the main light, or it may be used independently as a parking or dimmed light. The portion of the casing back E on which this light is mounted is hinged to the casing so that it may swing backwards as a door, as indicated by dotted lines in Figure 3, and allows of its light beams being thrown rearwardly on to various parts of the vehicle and used as a trouble light.

The details of construction of the lamp casing and the method and means for securing the electric lamps and the glass coverings therein, will follow the usual practices prevailing in the manufacture of these classes of articles. These details need not therefore be herein described.

I claim:—

In a head lamp of the type described and including a casing having a front-opening covered in its upper portion by frosted glass and in its lower portion by clear glass, a lamp fixed in the back of the casing with its axis horizontal, a conical reflector attached therearound with its axis horizontal, said conical reflector being truncated in the vertical direction from a point near the front of the casing to a point near the middle of the casing and the frosted glass extending below the top edge of the reflector, whereby all the directly-reflected light rays from said lamp are reflected forwardly in a beam directed below the horizontal plane through the center of the headlight parallel to the road.

In testimony whereof, I affix my signature.

THOMAS POLLARD KNIGHT RASHLEIGH.